Dec. 26, 1922.

I. KOECHLIN.
BRAKE OPERATING DEVICE FOR VELOCIPEDES.
FILED NOV. 12, 1920.

INVENTOR:
Isaac Koechlin
By Wm Wallace White
ATTY.

Patented Dec. 26, 1922.

1,440,017

UNITED STATES PATENT OFFICE.

ISAAC KOECHLIN, OF LEVALLOIS-PERRET, FRANCE, ASSIGNOR TO SOCIETE ANONYME DES AUTOMOBILES & CYCLES PEUGEOT, OF LEVALLOIS-PERRET, SEINE, FRANCE.

BRAKE-OPERATING DEVICE FOR VELOCIPEDES.

Application filed November 12, 1920. Serial No. 423,536.

*To all whom it may concern:*

Be it known that I, ISAAC KOECHLIN, citizen of the French Republic, residing at Levallois-Perret, Seine, in the Republic of France, have invented new and useful Improvements in Brake-Operating Devices for Velocipedes, of which the following is a specification.

This invention relates to a brake operating device which is applicable to a brake for bicycles or like apparatus, the braking action being obtained by reversing the direction of rotation of the cranks, that is, by back pedaling.

According to this invention, the shaft carrying the pedals is provided with a screwthreaded portion screwing into a nut which is provided with a coupling surface adapted to engage the sprocket wheel and another coupling surface adapted to engage a ring or sleeve connected with the brakes, the said ring having a limited movement of rotation and being also prevented from moving in the axial direction; a spring is provided for braking the movement of rotation of the said nut.

Among other advantages the improved construction allows the machine to be moved backward by hand.

The accompanying drawings show by way of example an embodiment of this invention.

Figure 1:
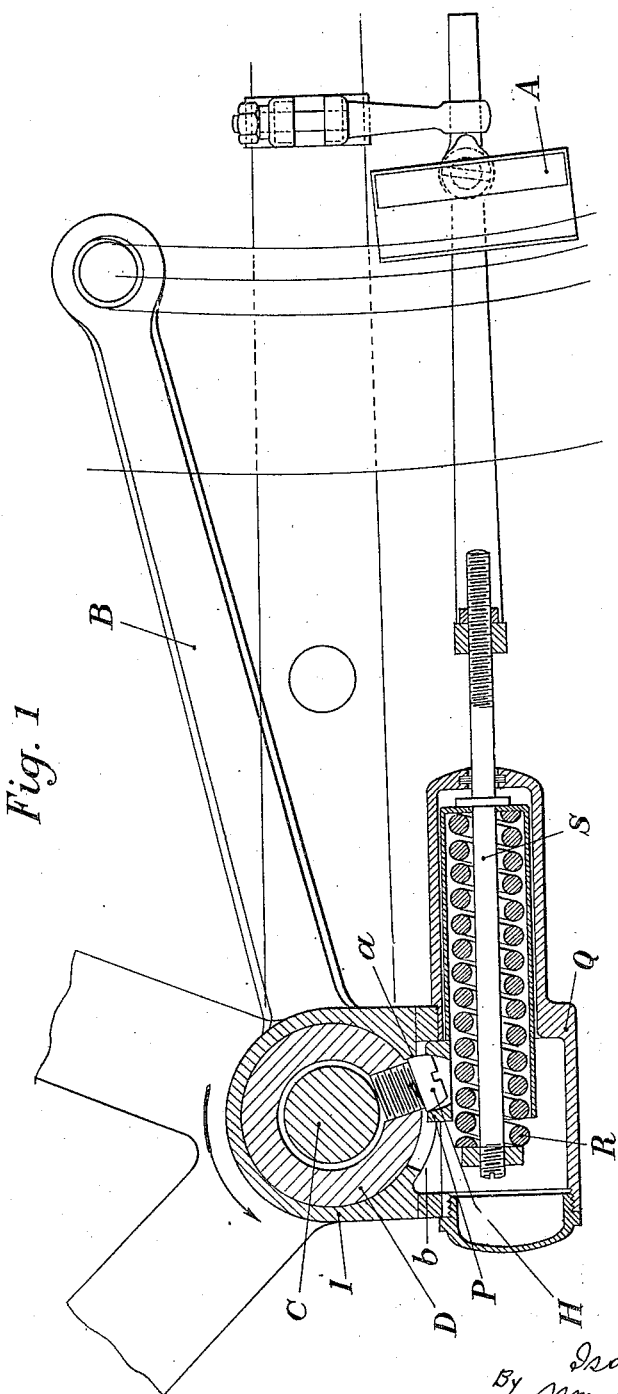
Fig. 1 is a vertical section of a device for brake operation by back pedaling, constructed according to this invention.
Figure 2:
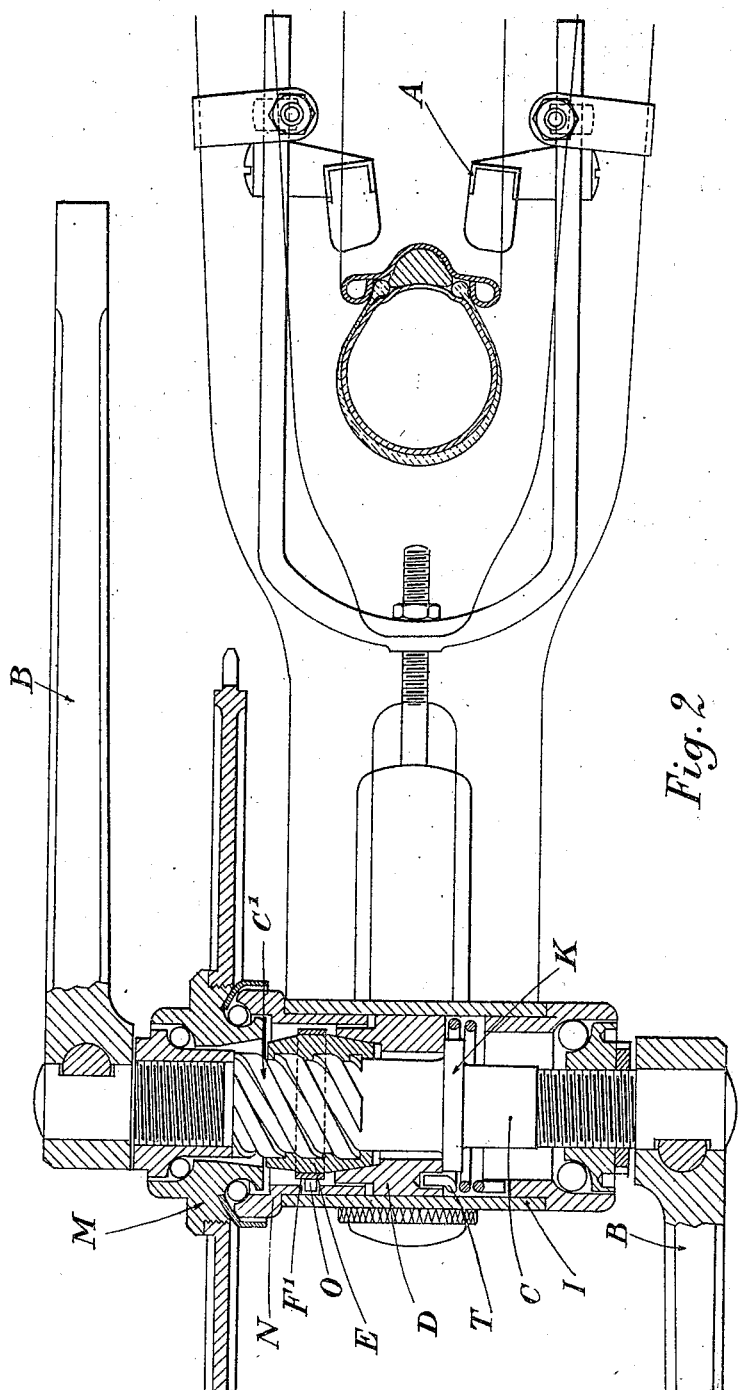
Fig. 2 is a corresponding horizontal section, partly in plan view.

As shown in the drawing, the pedal cranks B are secured to the shaft C which is provided with a screwthreaded portion $C^1$. In the present example, this screwthread is right-handed, but in other cases it might be made left-handed. D indicates a ring or sleeve having a conical internal bearing surface and contacting a shoulder K of said shaft C. A nut E screwed upon the screwthreaded portion $C^1$ is provided with two conical coupling surfaces one of which can engage into a conical bore in the hub M of the sprocket wheel which rotates freely on the axle C while the other coupling surface on the nut E can engage into a corresponding recess of the said ring D. $F^1$ indicates a resilient frictional member secured in a bearing sleeve N by means of a projection O and acting by friction upon the said nut E. A screw H screwed into the ring D has its head engaged into an opening provided in a tubular member P which is guided by a casing Q secured to the pedal casing I. The head of the screw H and the opening in the sleeve P are given an involute shape analogous to that of gearing, to provide the proper engagement. The head of the screw moves in a transverse slot *a b* in the casing I whereby the ring or sleeve D has a limited angular movement within said casing. R indicates a shock absorbing spring for obviating all abrupt movements during the braking action and for transmitting the effort of the arm or screw H to the brake rod S actuating the brake shoes A. In case of defective adjustment resulting from the excessive wear of the brake shoes, the member P will contact the pedal casing I before the spring R is entirely compressed, and therefore the said spring will always be interposed during the braking movement.

The operation is as follows:

When in normal running, in the sense of the arrow, the shaft C will rotate, and the nut E which is braked by the resilient member $F^1$ and acted upon by the screwthreaded portion $C^1$ of the shaft C is caused to bear by the conical portion thereof upon the hub M of the sprocket wheel, thus actuating the latter. By stopping the movement of the pedals, the nut E will now become blocked in case the machine has a loose rear wheel, or in the contrary case it will become disengaged from the hub M and the sprocket wheel will rotate after the manner of a loose wheel.

Upon reversing the movement of the pedals, the nut E will engage the ring D at the conical portion thereof and will draw it by a rearward motion, thereby actuating the brake.

By again operating the pedals in the forward direction, the ring D is actuated until the arm H contacts the pedal casing at *a*, and at this moment, upon the continuation of the movement, the nut E is disengaged from the ring D and engages the hub M, again actuating the same. A spring T disposed within the pedal casing I serves to aid in effecting the return movement of the brake and holds the latter in the inoperative position.

From the preceding considerations it will readily be understood that the bicycle can be wheeled by hand in the rearward direction. Two cases may occur in this connection:

*a.* The various members are supposed to be in the relative positions represented on the drawing; as shown, the nut E is loosened from the sprocket wheel M so that the pedal shaft C will not be actuated by the chain; on the other hand the return spring T holds the brake in its inoperative position, thus permitting the back motion of the bicycle.

*b.* On the contrary the nut E is supposed to be in engagement with the hub M; by the medium of the nut E and the screwthreaded portion $C^1$ of the pedal shaft C, the latter will be actuated by the backward rotation of the sprocket wheel. The backward rotation of the pedal shaft C will have no action upon the braking members as the nut E has been supposed loosened from the ring D, i. e., not in the suitable position for connecting the shaft C with the said braking members.

Figure 3:
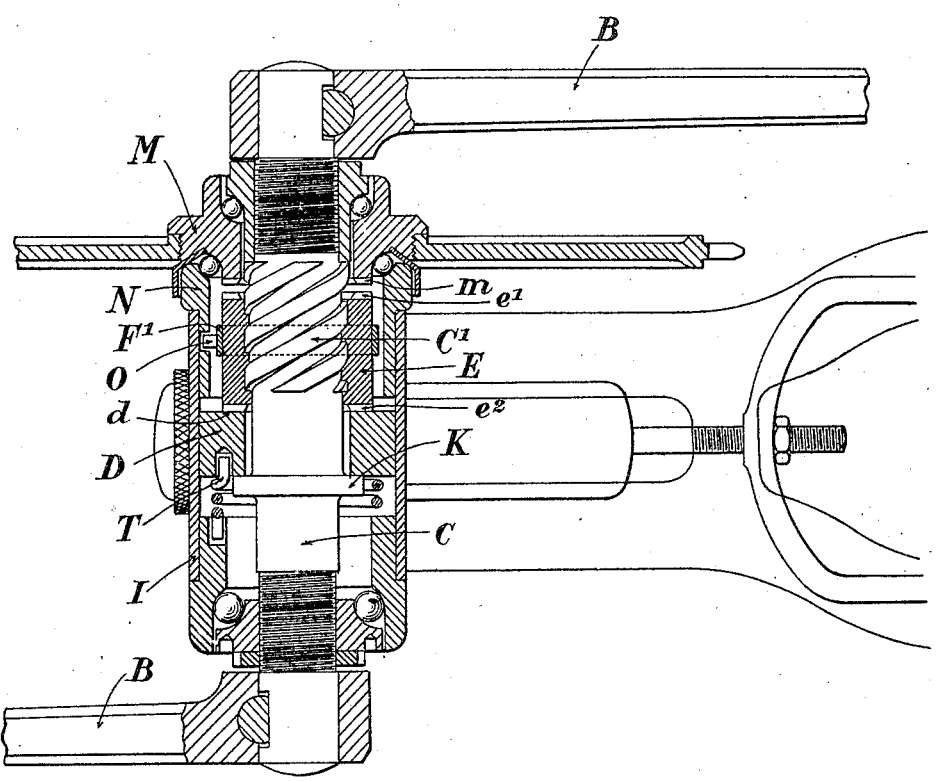
Fig. 3 is a similar horizontal section showing a modified form of a braking device according to this invention.

With reference to Fig. 3 it will be seen that it is possible to substitute suitable toothed crowns to the conical portions of the various members of the described device. As shown the nut M of the sprocket wheel is provided with teeth *m* and the ring D with teeth *d*; at the same time the movable nut E is provided with two series of teeth $e^1$ and $e^2$ adapted to respectively engage the corresponding teeth *m* or *d*. The working of the device is similar to that above described.

Having now described my invention, what I claim as new and desire to secure by Letters Patent is:

1. A back pedaling brake for velocipedes comprising in combination an axle adapted to be rotated in either forward or reverse direction, a driven member rotatably mounted on said axle and having a coupling surface, a helical projection on said axle, a nut member in engagement with said helical projection and having two coupling surfaces one of which is adapted to engage with the coupling surface on the driven member, a sleeve having a coupling surface adapted to engage with the other coupling surface on the nut member, means for rotatably supporting the said sleeve so that it may have a limited angular movement, means for preventing any axial displacement of said sleeve, yielding means adapted to brake the movement of rotation of the nut member, braking members and means for operatively connecting the said sleeve to the said braking members.

2. A back pedaling brake for velocipedes comprising in combination an axle adapted to be rotated in either forward or reverse direction, a driven member rotatably mounted on said axle and having a coupling surface, a helical projection on said axle, a nut member in engagement with said helical projection and having two coupling surfaces one of which is adapted to engage with the coupling surface on the driven member, a sleeve having a coupling surface adapted to engage with the other coupling surface on the nut member, means for rotatably supporting the said sleeve so that it may have a limited angular movement, means for preventing any axial displacement of said sleeve, a coil spring adapted to rotate said sleeve in one direction, yielding means adapted to brake the movement of rotation of the nut member, braking members and means for operatively connecting the said sleeve to the said braking members.

3. A back pedaling brake for velocipedes comprising in combination an axle adapted to be rotated in either forward or reverse direction, a driven member rotatably mounted on said axle and having a toothed crown, a helical projection on said axle, a nut member in engagement with said helical projection and having two opposite toothed crowns one of which is adapted to engage with the toothed crown on the driven member, a sleeve having a toothed crown adapted to engage with the other toothed crown on the nut member, means for rotatably supporting the said sleeve so that it may have a limited angular movement, means for preventing any axial displacement of said sleeve, yielding means adapted to brake the movement of rotation of the nut member, braking members and means for operatively connecting the said sleeve to the said braking members.

In testimony whereof I have signed my name to this specification.

ISAAC KOECHLIN.